(12) United States Patent
Harding et al.

(10) Patent No.: US 8,612,336 B2
(45) Date of Patent: Dec. 17, 2013

(54) FINANCIAL PRODUCTS BASED ON A SERIALIZED INDEX

(71) Applicant: IntercontinentalExchange, Inc., Atlanta, GA (US)

(72) Inventors: John Harding, Northfield, IL (US); Thomas Farley, New York, NY (US); David Goone, Glencoe, IL (US); Chris Crowley, Brooklyn, NY (US); Chris Edmonds, Burr Ridge, IL (US); Mark Rowell, London (GB); Jeffrey Sprecher, Atlanta, GA (US); Stanislav Ivanov, Clarendon Hills, IL (US); Donald F. Sternard, Clarendon Hills, IL (US)

(73) Assignee: IntercontinentalExchange, Inc., Atlanta, GA (US)

( * ) Notice: Subject to any disclaimer, the term of this patent is extended or adjusted under 35 U.S.C. 154(b) by 0 days.

(21) Appl. No.: 13/657,279

(22) Filed: Oct. 22, 2012

(65) Prior Publication Data

US 2013/0041805 A1  Feb. 14, 2013

(51) Int. Cl.
*G06Q 40/00* (2012.01)
(52) U.S. Cl.
USPC .......................................................... 705/37

(58) Field of Classification Search
USPC ............................................................ 705/37
See application file for complete search history.

(56) References Cited

U.S. PATENT DOCUMENTS

| 7,467,112 | B2 | 12/2008 | Frankel | |
| 7,930,238 | B2 * | 4/2011 | Frankel | 705/37 |
| 8,165,998 | B2 * | 4/2012 | Semerdzhiev | 707/690 |
| 2012/0109808 | A1 * | 5/2012 | Co et al. | 705/37 |

OTHER PUBLICATIONS

Dr. Mohamed El Morsalani, "*Correlation Trading: Facts and Challenges*," Financial Workshop Ulm, Sep. 2005, pp. 1-30.

* cited by examiner

*Primary Examiner* — Olabode Akintola
(74) *Attorney, Agent, or Firm* — DLA Piper LLP (US)

(57) ABSTRACT

A method for trading financial instruments includes listing, by an electronic financial exchange, financial instruments that specify which version of a serialized index the financial instrument tracks; receiving, by the electronic financial exchange, an electronic indication to buy or sell the financial instrument; executing, by the electronic financial exchange, a trade involving the financial instrument; and settling the financial instrument according to the version of the serialized index specified by the financial instrument.

16 Claims, 4 Drawing Sheets

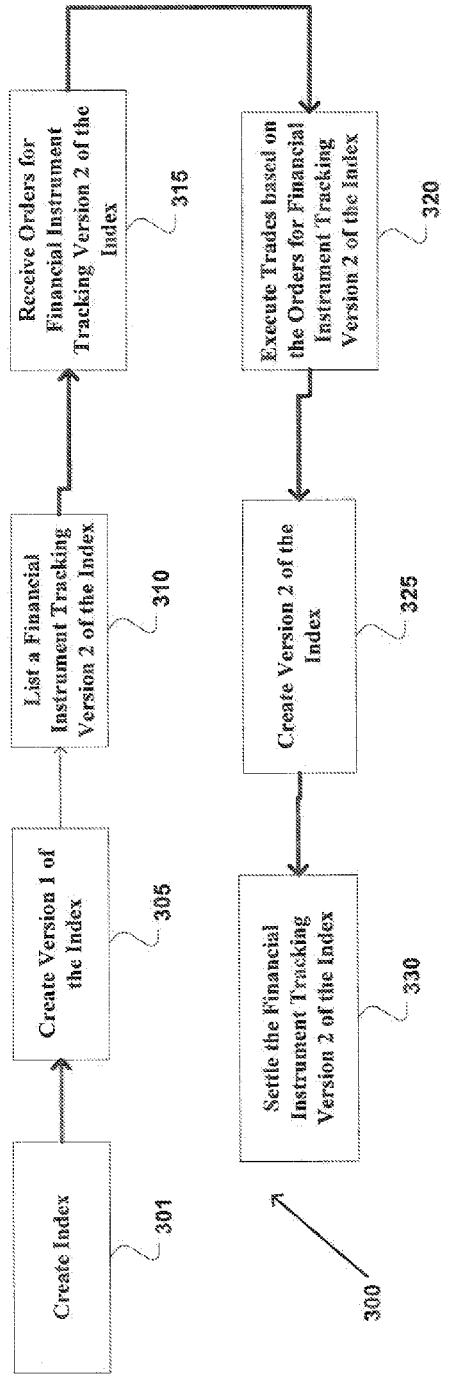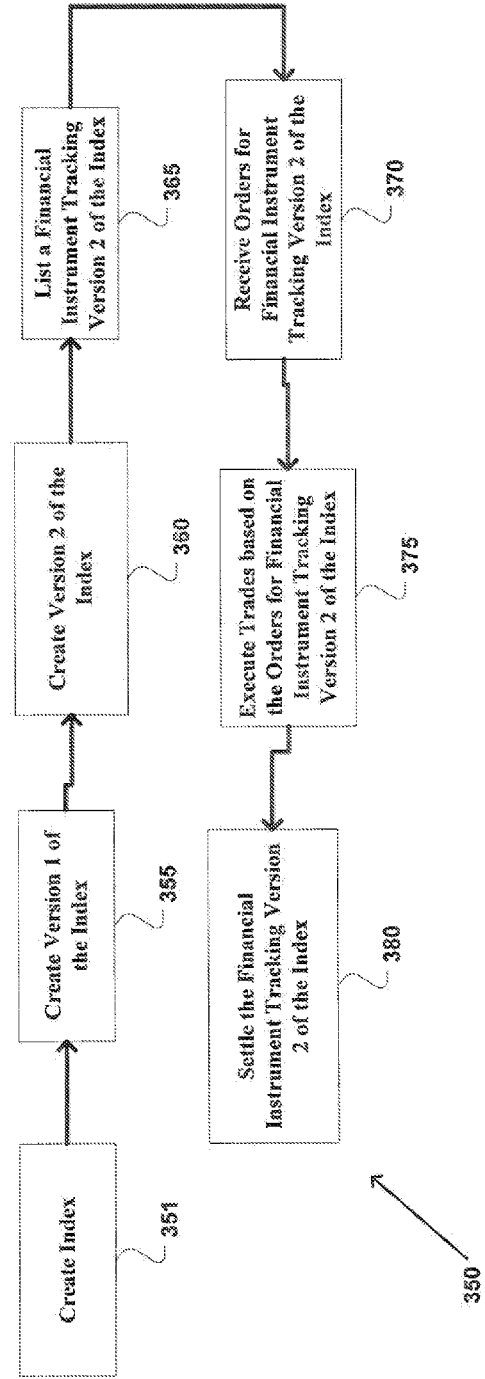

FINANCIAL PRODUCTS BASED ON A SERIALIZED INDEX

TECHNICAL FIELD

The disclosure is generally related to financial instruments and market indices, and more particularly to computer systems and methods for listing and trading financial instruments that track market indices.

BACKGROUND

Market indices are popular tools used by investors to describe and evaluate the performance of different areas of the financial marketplace. For example, market indices may be used for evaluating the performance of an entire stock market exchange, the performance of stocks of companies in a particular market segment, the performance of major high technology companies, the performance of growing biotechnology companies, etc. Additionally, market indices may be used to evaluate purpose-defined market segments, such as, for example, a subset of debt obligations. Market indices may also be created and used to pursue a wide variety of other goals.

In general, market indices are mathematical constructs based on a weighted aggregated value of one or more underlying assets. Because market indices are mathematical constructs, investors may not directly invest into market indices. Investors may, however, invest in financial instruments that attempt to mirror the performance of a market index. This may be accomplished, for example, by creating a fund that includes many of the same assets constituting a particular market index, and issuing financial instruments (such as securities) that represent the fund. Alternatively, financial institutions may issue financial instruments that are contracts that settle according to the value of a market index on a specified date. However, purchasing such financial instruments may not adequately hedge risks to which investors are exposed if the underlying market index is continually modified rather than new compilations of such market index being serialized, i.e., investors cannot currently continue to trade prior versions of a market index, but are instead limited to only trading the current compilation of such index.

Consequently, it is highly desirable to create a new type of financial instrument that is linked to or 'tracks' an index configured to retain each version of the index as it undergoes periodic and/or previously unannounced changes. Such a financial instrument would allow an investor to invest in any version of the index, including a future version that does not yet exist.

SUMMARY

The present disclosure relates generally to a method for trading financial instruments that track a particular version of a serialized index. In one embodiment, financial instruments may be listed by a computing device. Each financial instrument may specify which version of the serialized index it tracks. Once listed, an electronic financial exchange system may receive buy and sell indications for the purchase or sale of the financial instrument. A financial instrument trade may be executed by the electronic financial exchange system. The trade may than be settled according to the version of the serialized index specified by the financial instrument.

In another embodiment, various financial instruments may track various versions of the serialized index. These various financial instruments may be listed for trading via an electronic financial exchange system.

In yet another embodiment, designated versions of a serialized index may be established over time. Several financial instruments, each tracking a different designated version of the serialized index, may then be listed and traded. More specifically, the financial instruments may be traded based on the designated version of the serialized index tracked by each of the financial instruments.

In yet another embodiment, multiple versions of a serialized index may be defined and transmitted to a financial institution server. Some versions of the serialized index may then be tracked by any number of financial instruments.

A system for trading financial instruments may include a listing module, an orders module, a trade execution module and a settlement module. The listing module may be configured to list financial instruments specifying the version of a serialized that is tracked by each financial instrument. The orders module may be configured to receive buy and sell indications for the financial instruments. The trade execution module may be configured to execute trades involving the financial instruments. The settlement module may be configured to settle each financial instrument using the value of the version of the serialized index tracked by each respective financial instrument.

In another embodiment, a system for trading financial instruments may include an index server, a financial institution server, and an exchange server. The index server may be configured to define a serialized index, and to define several versions of the serialized index. The financial institution server may be configured to provide financial instruments that track one or more versions of the serialized index. The exchange server may be configured to execute trades of the financial instruments.

In yet another embodiment, a system for creating a serialized index may include a configuration module and a transmission module. The configuration module may be configured define several versions of the serialized index, and the transmission module may be configured to transmit the definitions of the versions of the serialized index to one or more servers, where the versions of the serialized index may be tracked by one or more financial instruments.

BRIEF DESCRIPTION OF IRE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings:

FIGS. 3a-3b are flowcharts illustrating alternative exemplary methods of listing, trading and settling financial instruments that may track multiple versions of a serialized index.

DETAILED DESCRIPTION

Figure 1:
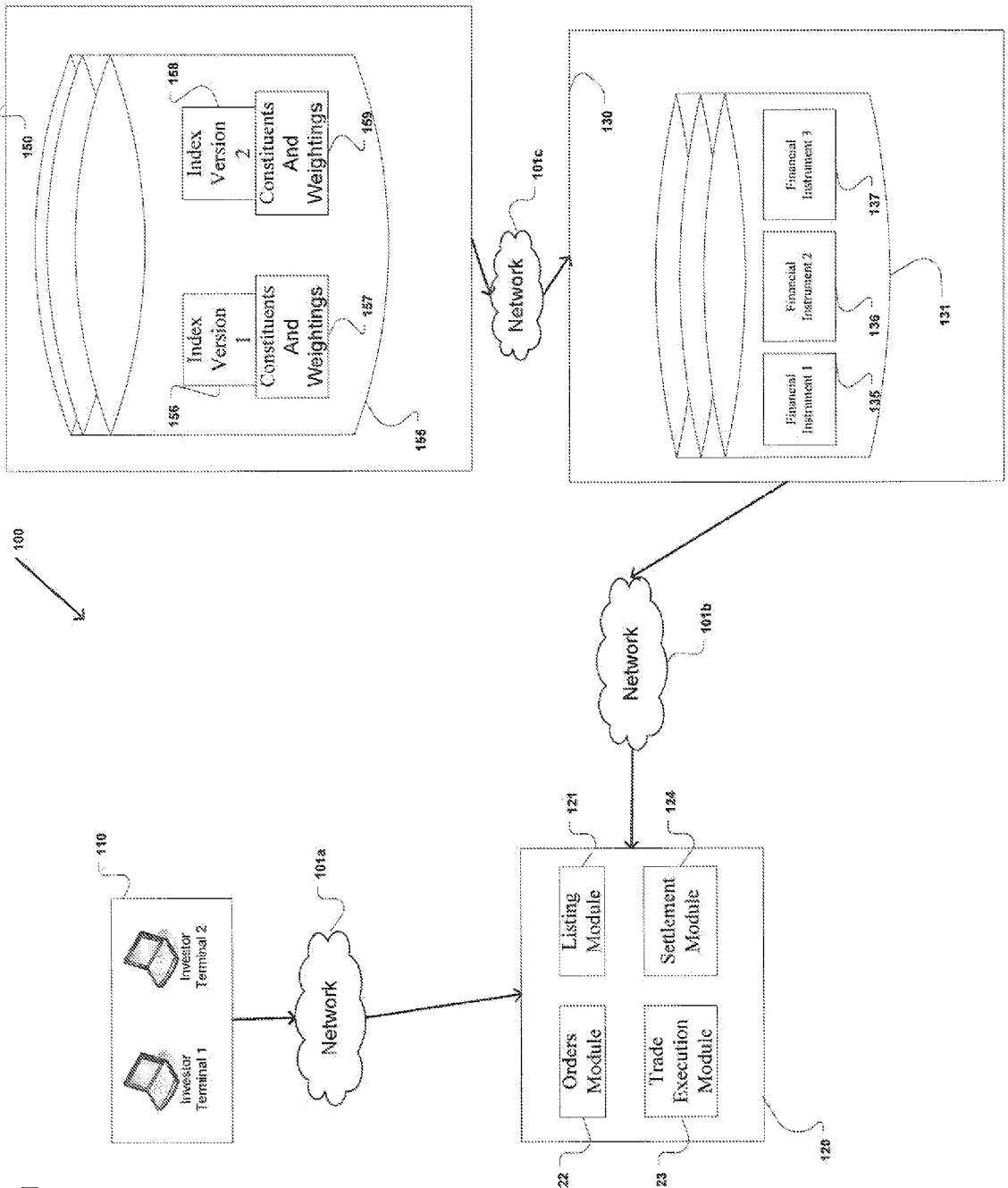
FIG. 1 is a block diagram illustrating an exemplary system for trading financial instruments that track multiple versions of a serialized index, according to various embodiments.

The present disclosure relates generally to systems and methods for generating and maintaining a serialized index, wherein each time a new version of the serialized index is created one or more prior versions of the index may remain active. As a result, financial institutions may be configured to track a current, future, or prior version of the serialized index. In one embodiment, such financial instruments may be listed by an electronic financial exchange. The electronic financial exchange may then receive buy and sell orders for the financial instruments, execute trades and settle the financial instruments according to the version of the serialized, index specified by the financial instrument.

For purposes of this disclosure, a financial instrument shall mean any real or virtual document representing a legal agreement involving some sort of monetary value. In an exemplary embodiment, a financial instrument may refer to a financial derivative, which is simply a financial instrument whose price depends upon, or is derived from, one or more underlying assets. Such underlying assets may include, for example, stocks, bonds, commodities, currencies, interest rates and market indices. In the case of market indices, fluctuations in a particular underlying market index may be used to determine the value of the financial derivative. Financial derivatives that depend from (i.e., are priced based on) a value of a market index are said to "track" that market index. Such financial derivatives may include (without limit): futures contracts, forwards contracts, options contracts, swaps contracts, etc.

A market index refers to an aggregate value produced by combining several investment vehicles together and computing their total values, where the value of each vehicle may be adjusted by a weighting factor. A serialized index is therefore a series of one or more versions of a particular market index, each linked or related to each other, while at the same time defining a respective combination of investment vehicles. For purposes of this disclosure, the investment vehicles that comprise a particular version of a serialized index shall be referred to as constituents, and may include (without limit) stocks, bonds, securities, commodities, mutual funds, other market indices, forwards, options, and derivatives. Further, when combined to form a particular serialized index version, each constituent may be weighted, as desired, to control the influence that a particular constituent has on the aggregated value of the index version. Thus, for example, constituents with higher weightings will have more influence over the aggregated value of an index version than constituents with lower weightings.

A version of a serialized index, as noted above, refers to a particular embodiment or incarnation of a series of related market indices. Thus, for example, a first version of a serialized index may be defined by three particular constituents, namely, Constituent 1, Constituent 2 and Constituent 3, For purposes of this example, it will be assumed that each of Constituents 1, 2 and 3 are weighted equally. A second version of this serialized index may therefore be defined by applying different weighting values to the same three constituents and/or by adding or removing constituents. A third version may even be defined by simply removing Constituent 3 from the combination defined by the second version. Collectively, versions 1-3 and/or other versions comprise a serialized index. Notably, creation of a current or subsequent version does not necessarily result in deletion of a prior version. In other words, version 2 of the serialized index will not necessarily replace version 1. To the contrary, any of the versions may co-exist with any other versions, and cancellation or discontinuation of a version will not necessarily affect any other version.

In a first exemplary embodiment, the present disclosure relates to a method of trading financial instruments that track a serialized index. As an initial step, the method includes listing, via one or more computing devices, a financial instrument for purchase or sale. For purposes of this disclosure, listing a financial instrument refers to generating and posting data defining the financial instrument on an electronic financial exchange that is accessible by one or more trading participants via, for example, computer terminals. As further discussed below, the generating and/or posting functions may be accomplished at a single facility, or by multiple facilities using one or more devices such as, for example, computer servers. If multiple facilities are used, data defining the financial instrument may be defined at a first facility using one or more computer servers. The data defining the financial, instrument may then be transmitted over a wired or wireless electronic communications network to one or more computer servers at a second facility. Once received at the second facility, the data defining the financial instrument may be posted so that trading participants with access to the second facility (such as via participant computer terminals) are able to view the financial instrument. The communications network may comprise any of the following: the Internet, an intranet, a telephonic network, a cellular network or any other type of a data network.

Since the financial instrument tracks a serialized index, the financial instrument may specify which version of the serialized index the financial instrument tracks. For example, the a particular financial instrument may specify that the instrument tracks the third version of the serialized index. Notably, in one embodiment, the third version does not need to exist at the time this financial instrument is created and listed. To the contrary, the third version (or any other version specified in any financial instrument) may be created before, concurrent with or after the financial instrument is created and listed for trading. It is also noted that additional financial instruments, also tracking the same version (e.g., the third version), may be created, listed and available for trading at the same time. Similarly, multiple financial instruments, tracking different versions of the serialized index, may also co-exist and be listed and available for trading at the same time.

Once the financial instrument is listed, participants may view and submit electronic indications to buy or sell the financial instrument over a wired or wireless communications network using, for example, participant computer terminals. In one embodiment, the electronic indications may be received directly by an electronic financial exchange server. The participant computer terminals may comprise remote servers, mobile communication devices, desktop computers, smart phones, PDAs (personal data assistants), mobile computers, tablet computers, or any other device configured to communicate electronic indications.

Upon receiving an acceptable indication to buy or sell the financial instrument, a trade for the financial instrument may be executed via, for example, the electronic financial exchange server listing the financial instrument or by any other trade execution module embodied in one or more other computing devices. Then, on a specified date, the financial instrument may be valued and settled according to the version of the serialized index specified by the financial instrument. This settlement may be accomplished via one or more computer devices at a separate clearing facility or at the facility listing the financial instrument.

In a second exemplary embodiment, the present disclosure relates to another method of trading financial instruments that tracks a serialized index. As an initial step, the method includes providing, via one or more computing devices, a serialized index. For purposes of this disclosure, providing a serialized index may include defining and making available, in any fashion, the definition of the constituent composition of one or more versions of the serialized index. The constituent composition of each version of the serialized index may include a respective combination of constituents and their associated weightings. Each version of the serialized index may be defined and/or provided by an index definition system. Such an index definition system may comprise one or more servers, residing at a single location or across multiple locations, where each server may comprise associated databases that may store the definitions of the one or more versions of the serialized index. The index definition system may use a wired or wireless communications network to transmit the index definitions and version compositions internally amongst its one or more servers, or to other remote computer devices. The index definitions may include a current version of the serialized index and one or more prior versions that were defined in the past. In another embodiment, some versions may have been discontinued prior to, upon the creation of, or after the creation of a current version. The current version of the serialized index and a prior version of the serialized index may have different constituents and/or different constituent weightings. Notably, however, current and prior versions may co-exist.

Once the serialized index is provided, one or more computing devices may provide one or more financial instruments that track one or more of the index versions. These computing device may be a part of a financial exchange system, or they may simply be a part of a larger network of devices. For purposes of this disclosure, providing a financial instrument refers to defining and/or storing the specific terms of the financial instrument, including the terms of the underlying financial agreement which specifies which version of the serialized index will be tracked, and performing all other steps needed to define and make the financial instrument available for trading. For example, if the financial instrument is a futures contract, providing a financial instrument may include specifying which version of a serialized index will be tracked, and defining the date on which the futures contract will be settled. Additionally, providing a financial instruments may also comprise registering the financial instrument with an appropriate regulatory authority and complying with all other legal requirements. In one embodiment, financial instruments may be provided by the same system that provides the serialized index. In another embodiment, financial instruments may be provided by one or more servers belonging to an independent financial exchange facility. Wired or wireless networks may be used to communicate the terms of the financial instruments to other devices within or across various facilities and/or systems.

Once the financial instruments are provided, one or more computing devices, e.g. servers, may list the financial instruments for purchase or sale. One or more of these computing devices may be a part of, for example, one or more financial exchange systems. For purposes of this disclosure, listing a financial instrument for purchase or sale refers to generating and posting data defining the financial instrument on a financial exchange, and making the data accessible by one or more trading participants via, for example, one or more computing devices. In one embodiment, the computing devices that list the financial instruments may be a part of or otherwise associated with, the same system that provides financial instruments.

As noted above, the listed financial instruments may track the serialized index. Consequently, each of the financial instruments may specify which version of the serialized index is tracked. Notably, multiple financial instruments may track different versions of the index. For example, one financial instrument may track a first version of a serialized index that is already defined, while another financial instrument may track a second version the serialized index that may be defined in the future. Yet another financial instrument may specify that it will be settled on a designated date according to the version of the serialized index that will be current on that designated date.

Once a particular listed financial instrument is traded, it may be valued and settled according to the version of the serialized index specified by that financial instrument. This settlement may be accomplished, for example, via one or more computer devices comprising a separate system or network, and/or by computer devices comprising a system associated with a financial exchange system that lists financial instruments. The settlement functionality may, for example, comprise calculating the amounts of funds that are due to be delivered to one or more of the trading participants, wherein the calculation may be accomplished using the value of the tracked version of the serialized index on a specified date.

In a third exemplary embodiment, the present disclosure relates to a method of trading financial instruments that track a serialized index via one or more computing devices. As an initial step, the method includes providing, via one or more computing devices, a serialized index. As indicated above, providing may include defining and making available, in any fashion, the definition of the composition of one or more versions of the serialized index. The listing feature may be performed by an index facility, for example, using one or more devices such as computer servers. In one embodiment, a designated first version of the serialized index may be provided initially. After a certain period of time, a designated second version of the serialized index may also be provided. After another period of time, a designated third version of the serialized index may be provided, and so on. Successive versions may differ from one another based on their selection of constituents, combination of constituents and/or constituent weightings. The time periods between successive versions may be regular, defined in advance, irregular and/or not defined in advance. Notably, a wired or a wireless network may be used to make the index definitions and version constituent compositions available to other computing or communication devices.

Once the serialized index is provided, one or more exchange systems may list financial instruments via or more computer devices, wherein each financial instrument may track a particular designated version of the serialized index. As discussed above, listing a financial instrument may include generating and posting data defining the financial instrument via an exchange system that is accessible by one or more trading participants. Once the data defining the financial instruments is posted, trading participants with access to the exchange system (such as via participant computer terminals) are able to view, access and initiate transactions relating to the financial instruments.

Each of the listed financial instruments may track a particular designated version of a serialized index. For example, one listed financial instrument may track a designated first version of the serialized index, while another listed financial instrument may track a designated second version of the serialized index, whether said second version currently exists or whether said second version is to be created in the future.

Once the financial instruments are listed, one or more financial exchange systems may trade a selected financial instrument that tracks a designated version of the serialized index. For purposes of this disclosure, trading a financial instrument refers to executing any kind of a financial transaction involving a financial instrument. Such trading functions may be accomplished by a financial exchange system using one or more devices, such as computer servers, based on buy and sell orders received from one or more client computer terminals. The trading functions may also be based on the information related to the particular designated version of the index being tracked by that financial instrument.

In yet another exemplary embodiment, the present disclosure relates to a method of maintaining a serialized index by one or more computing devices. As an initial step, the method includes defining, via one or more computing devices, one or more versions of a serialized index. Defining a version of a serialized index, for the purposes of this disclosure, may include selecting, combing and making available, in any fashion, a combination of constituents and their associated constituent weightings. This defining feature may be performed by one or more devices such as computer servers, and may also include defining multiple versions of the serialized index. For example, a first version of the serialized index may be defined first. After a certain time period, a second version of the serialized index may be defined. The first version and the second version may be defined to have different constituents and/or different associated constituent weightings.

Once the one or more versions of the serialized index are defined, they may be transmitted to other devices, for example, via a wired or a wireless network. In one embodiment, the data defining the versions of the serialized index may be transmitted to one or more financial institution servers. Each version of the serialized index may be tracked by one or more financial instruments. For example, one financial instrument may be a futures contract whose settlement may be based on the value of a particular version of a serialized index on a particular date. Other financial instruments may simultaneously track the same and/or other versions of the serialized index.

Notably, one or more of the method steps and/or processing features discussed above may be performed by one or more computing devices, residing in one or more connected systems or networks, comprising one or more processors executing instructions stored in a memory. In one embodiment, a computer system for trading financial instruments that track one or more versions of a serialized index comprises one or more processors configured to execute instructions stored on a non-transitory memory. The instructions, when executed, may define a listing a module, an orders module, a trade execution module and a settlement module.

The listing module may be configured to list a financial instrument for purchase or sale. For purposes of this disclosure, listing a financial instrument for purchase or sale may include generating and posting data defining the financial instrument on a financial exchange system that may be accessible by one or more trading participant computing terminals. The posted data may also be made available for use by other modules of the system. The posted data may define, among other things, which version of the serialized index is to be tracked by each financial instrument. For example, one financial instrument may be defined to track a particular version of the serialized index, while another financial instrument may be defined to track a "to-be-created" version of the serialized index that will be defined in the future. Different versions of the serialized index may be defined to have different constituents Alternatively, different versions of the serialized index may be defined to have the same constituents as other versions, but with different associated constituent weightings.

A most recently defined version of the serialized index may be designated as current, while all other previously defined versions may be designated as prior versions. The listing module may be configured to list one or more financial instruments that always tracks the "current" version of the serialized index. The listing module may, at the same time, be configured to list other financial instruments that track one or more of the prior versions of the serialized index.

The orders module may be configured to receive electronic indications to buy and sell financial instruments over a wired or wireless communications network that were sent, for example, via participant computer terminals. The electronic indications may specify which listed financial instrument is to be sold or bought, a desired price, a desired delivery time, a desired quantity and any other pertinent information. The orders module may optionally, aggregate the received electronic indications and make the aggregated data available to other modules of the system.

The trade execution module may be configured to use the data received by the orders module to execute trades involving the listed financial instruments. The trade execution module may be configured to match buy and sell orders and, for example, determine the final price of a financial instrument using price determination algorithms. The trade execution module may further be configured to send digital trade confirmation data of an executed trade to participant computer terminals and/or post-trade processing systems using a wired or a wireless network.

The settlement module may be configured to use the data defining the financial instrument to settle the financial instrument on a specified date. The settlement module may further be configured to value and settle a financial instrument by using the value of the version of the serialized index specified by the financial instrument. The settlement module may also be configured to communicate with a separate clearing facility, that comprises one or more computer devices, via a wired or wireless network. For example, if a financial instrument according to the present disclosure comprises a futures contract that is defined to settle according to a particular version of a serialized index, the settlement module may perform the necessary calculations to determine the value of the contract, and transfer appropriate funds to or from appropriate participant account(s).

In another exemplary implementation, a computer system for trading financial instruments that track a serialized index may comprise an index server, a financial institution server rind an exchange server. These servers may reside at one or more facilities and/or be a part of a one or more systems or networks, and they may communicate with each other using wired or wireless network(s). The servers may corn rise processors configured to execute instructions stored on a non-transitory memory. Execution of the instructions may cause the servers to perform any of the features described below.

The index server may be configured to define a serialized index. This index server may further be configured to store the constituents compositions and the associated constituent weightings of one or more versions of the serialized index in the index server memory. The index server may also be configured to use a wired or wireless communications network to transmit the version compositions and/or weightings to other devices (e.g., computers or servers). One or more versions of the serialized index stored by the index server may concurrently comprise a current version of the serialized index and one or more versions of the serialized index that were defined in the past and are no longer current. In another embodiment, some prior versions of the serialized index may be designated discontinued. The current version of the serialized index and a prior version of the serialized index may have different constituents and/or different constituent weightings. Additionally, current and prior versions may co-exist and may be tracked by one or more financial instruments at the same time.

The financial institution server may be configured to receive the definitions of the versions of the serialized index, and to provide one or more financial instruments designed to track specific versions of the serialized index. In one embodiment, the financial institution server may be connected to, or be a part of the index server. In order to provide one or more financial instruments, the financial institution server may be configured to define and store the specific terms of a financial instrument and perform all other necessary steps needed to make the instrument available for trading. The financial institution server may also be configured to use a wired or a wireless network to communicate the terms and other details of the financial instrument to other devices such as computers, servers, etc. The terms and/or other details of the financial instrument stored by the financial institution server may specify which version of the serialized index is to be tracked by the financial instrument.

The exchange server may be configured to list for purchase or sale the financial instruments that are provided by the financial institution server. The exchange server may be configured to list a financial instrument by generating and/or storing data defining the financial instrument, and making the data accessible by, for example, one or more trading participants' computer terminals. In one embodiment, the exchange server may be a part of a financial institution server that provides financial instruments. The listed financial instruments may track the serialized index, consequently specifying which version of the serialized index is tracked. Multiple financial instruments may track different versions or the same version of the serialized index. The exchange server may be configured to list the financial instruments in accordance with terms specified by each financial instrument. In addition, the exchange server may be configured to conduct trades that take into account the settlement date and the version of the serialized index that is tracked by a particular financial instrument.

Upon receiving an acceptable indication to buy or sell a financial instrument, the exchange server maybe be configured to execute a trade involving the financial instrument. Then, on a specified date, the exchange server may be configured to value the financial instrument and to settle the financial instrument according to the version of the serialized index specified by the financial instrument. Alternatively, the exchange server may be configured to transmit executed trade data to a post-trade processing facility.

In another exemplary embodiment, a computer system for maintaining a serialized index may comprise one or more processors configured to execute instructions stored using a non-transitory memory. The instructions may define a configuration module and a transmission module.

The configuration module may be configured to define one or more versions of a serialized index, and to store the list of constituents and associated constituent weightings for each version of the serialized index. Each version may comprise a different list of constituents and/or different associated constituent weightings. The configuration module may be configured to store the data defining the versions of the serialized index and to make that data available to other modules of the system.

The transmission module may be configured to transmit data relating to the serialized index versions to other computing/communication devices, or to other elements of the system. For example, the transmission module may use a wired or a wireless network to transmit data defining a serialized index version to one or more financial institution servers. The different versions of the serialized index may be tracked by one or more financial instruments. Each financial instrument may specify which version of the serialized index is tracked.

Turning now to FIG. 1, an exemplary embodiment of a system 100 for listing and trading financial instruments according to this disclosure is shown. The system 100 comprises one or more investor terminals 110, an electronic financial exchange server 120, a financial institution server 130 and an index maintainer server 150. These elements may be connected by one or more wired or wireless networks 101a, 101b, 101c. For example, the networks 101a, 101b, 101c may comprise a public computer network such as the Internet, an intranet, telephone network and/or a cellular network. The networks 101a, 101b, 101c may refer to one single network or to a combination of networks of several different types.

The index maintenance server 150 may be configured to store serialized index information. The index maintenance server 150 may comprise one or more index databases 155 that may store data defining one or more serialized indices including the index constituents and the constituent weightings. Constituents may include, but are not limited to, stocks, bonds, securities, commodities, mutual funds, other indices, swaps, forwards, option and derivatives or any other type of a financial security. The one or more index databases 155 may also store data defining any number of index versions. For example, the data defining a first version of the serialized index 156 may include a list of constituents along with their associated weightings 157. The one or more index databases 155 may also store the data defining, e.g., a second version of the serialized index 158, which includes its combination of constituents and associated constituent weightings 159. Notably, constituents of the second version 158 of the serialized index and/or the associated weightings 159 may be different from those of the first version of the serialized index 156.

One of the versions of the serialized index may be designated as the current version. For example, data defining the second version of the serialized index 158 may be considered the current version of the serialized index, since it was created last. Other versions of the serialized index may be designated as a prior versions. The versions that have not been created yet may be designated as future versions. Thus, data defining the first version of the serialized index 156 may be designated a prior version of the serialized index because it was created prior to the second version 158. When data defining a new version of the serialized index is added to the one or more index databases 155, this new version may become designated as the current version, while all other versions, including the previously designated current version, may become (or remain) designated as prior versions. Some versions of the index may also be designated as "discontinued" or "terminated." The versions of the serialized index may be defined using version numbers or names, such that the version numbers or names indicate the order in which the index versions were created.

The index maintenance server 150 may communicate with the financial institution server 130 via a network 101c. Financial institution server 130 may receive the serialized index data from the index maintainer server 150 via said network 101c.

In one embodiment, the financial institution server 130 may store information defining financial instrument offerings using one or more financial databases 131. One or more of the financial instrument offerings 135, 136, 137 may track one or more versions 156, 158 of the serialized index.

A financial instrument may track a version of the serialized index if the terms of the financial instrument relate in any way to the value of that version of the index, or if the price of the financial instrument depends on the value of that version of the index. For example, the financial instrument may be a futures contract designed to be settled according to a value of a specific version of the serialized index. In another example, the financial instrument may track an index by representing a purchase of all constituents of the index in proportion to the constituent weightings. Such financial instruments 135, 136, 137 may include but are not limited to, futures contracts, forward contracts, options contracts and swap contracts.

In the embodiment illustrated by FIG. 1, financial instrument 135 may be designed to track version 1 of the serialized index 156, white a second financial instrument 136 may be designed to track version 2 of the serialized index 158. In another example, a third financial instrument 137 may be designed to always track a "current" version of the serialized index, which may change as new versions of the serialized index are created and become designated as "current."

The financial institution server 130 may communicate with the electronic financial exchange server 120 to receive financial instrument data (135, 136, 137), The electronic financial exchange server 120 may then list the financial instruments defined by the data stored on the financial institution sever 130. This communication may be carried out via, for example, a network 101b.

The electronic financial exchange server 120 may use the data and information received from the financial institution server 130 to list and facilitate trading of the financial instruments 135, 136, 137. Optionally, the financial exchange server 130 and the financial institution server 120 may be a part of the same institution or even be a part of the same server. The electronic financial exchange server 120 may comprise a listing module 121 for listing the financial instruments 135, 136, 137. Each of these financial instruments 135, 136, 137 may track a specified version of the serialized index. The listing module 121 may also store information about the financial instruments 135, 136, 137 and make such information available for viewing by users via, for example, investor computing terminals 110.

The electronic financial exchange server 120 may also comprise an orders module 122. The orders module 122 may be configured to receive buy and sell orders for financial instruments 135, 136, 137 listed by the listing module 121, where each financial instrument specifies which version of the index it tracks. In one embodiment, the orders are received from the investor terminals 110 via a network 101a. The electronic financial exchange server 120 may also comprise a trade execution module 123 configured to execute financial instrument trades based on the orders received by the orders module 122. Additionally, the electronic financial exchange server 120 may also comprise a settlement module 124. In one embodiment, the settlement module 124 may communicate with a clearinghouse server (not shown) to settle trades for financial instruments according to the version of the serialized index that the financial instruments track, in another embodiment, the settlement module 124 may itself settle trades for financial instruments according to the version of the serialized, index each financial instrument 135, 136, 137 tracks. For example, a financial instrument may be settled by calculating to financial obligation based on the value of the version of the serialized index that the financial instrument tracks.

The investor terminals 110 may communicate with the electronic financial exchange server 120 via network 101b to submit buy and/or sell orders for financial instruments 135, 136, 137 that track specific versions of the serialized index. In one embodiment, the investor terminals 110 may be configured to communicate with the electronic financial exchange server 120 via a broker server (not shown). The investor terminals 110 may comprise any device capable of sending electronic indications via the network 101a. For example, the investor terminals 110 may comprise a laptop computer, a server, a smartphone, a desktop computer, a kiosk and/or any other electronic computing or communication device.

The various components described herein with respect to the system 100 may include one or more computing devices, hand-held communication devices, mobile computers and/or any other electronic communication means. The components may be described in the general context of comprising computer-executable instructions, such as program modules, being executed by a computer. Generally, program modules may include routines, programs, objects, components, data structures, or the like that perform particular tasks or implement particular abstract data types.

Figure 2:
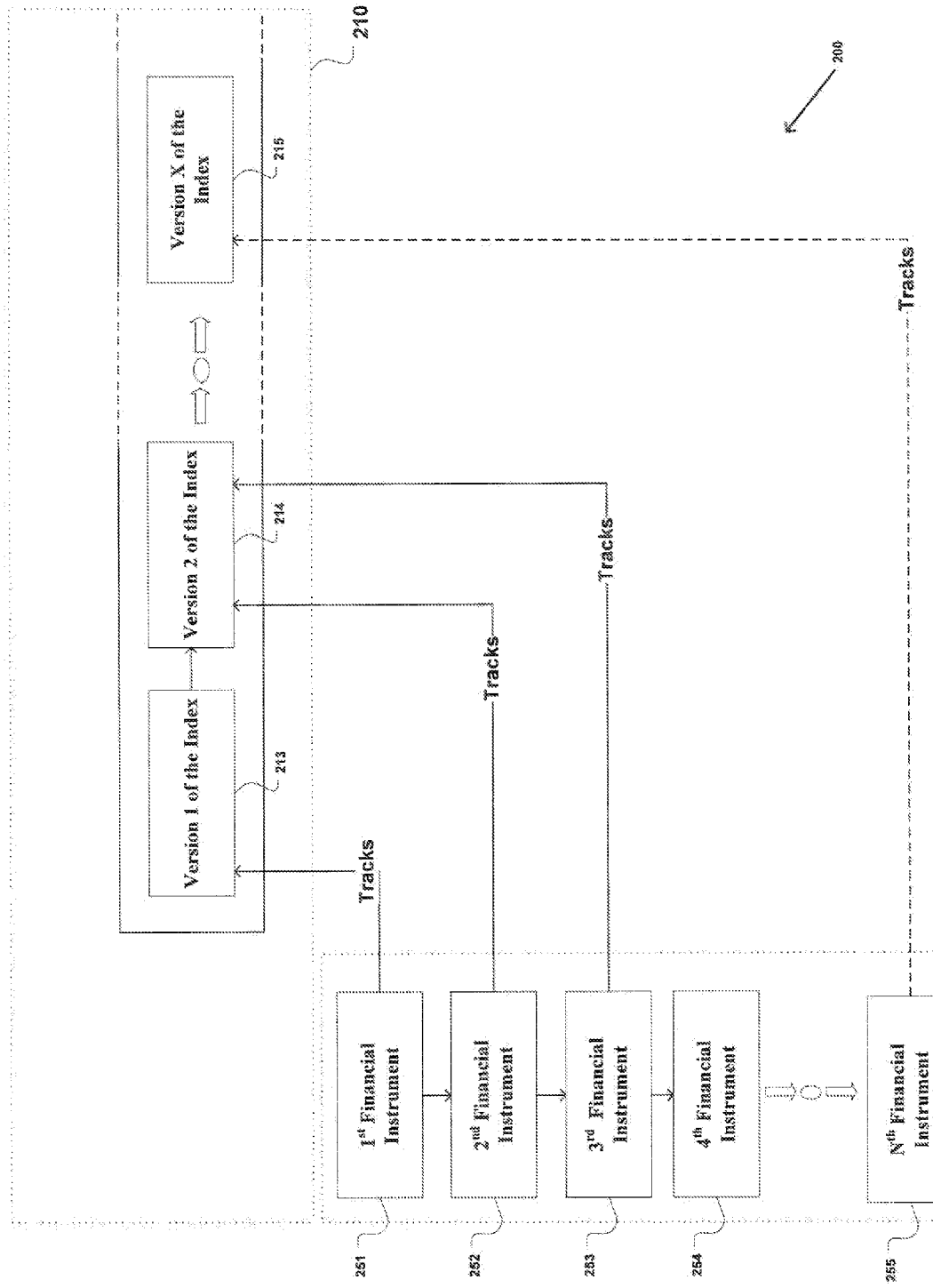
FIG. 2 is a chart illustrating exemplary financial instruments that may track multiple versions of a serialized index.

Turning now to FIG. 2, a chart illustrating an exemplary relationship 200 between financial instruments 251-255 and specific versions 213-215 of a serialized index 210 is shown.

The serialized index 210 shown in FIG. 2 may be defined to achieve a particular goal, such as, e.g., providing an analytical tool for a specific market segment. In another embodiment, the goal of the serialized index 210 may be used to track debt loads. The index definition may also contain the name of the index, methods used for creating new versions of the serialized index, time intervals at which new versions of the serialized index may be created and other pertinent serialized index information.

A version 1 (213) of the serialized index 210 may include a first combination of constituents along with their respective weighting factors, in one embedment, version 2 (214) of the serialized index 210 may have been created after a predetermined time period following the creation of version 1 (213), Version 2 (214) may be created, for example, by changing the weighting factors of the constituents and/or by adding new constituents and/or removing constituents that define version 1 (213).

Version X (215) refers to yet another version of the serialized index 210, where X represents an arbitrary integer. Version X (215) of the serialized index 210 may be created from any prior version of the of the serialized index 210 in a manner similar to that in which version 2 (214) of the serialized index 210 may be created from version 1 (213) of the serialized index 210. In one embodiment, an arbitrarily large number of serialized versions may be created and maintained. All versions of the serialized index (210), 1 through X (213-215), may be stored and maintained for any period of time where any of the versions 1 though X (213-215) may co-exist. In one embodiment, versions of the index 213, 214 and 215 may be defined by a computing device such as a server.

Financial instruments 251, 252, 253, 254 and 255, refer to financial instruments that may be listed by, e.g., by an electronic financial exchange server 250. The listing of the financial instruments 251-255 may enable investor terminals, in communication with the electronic financial exchange server 250, to place buy and sell orders for the listed financial instruments 251-255. The first, second, third, fourth and Nth financial instruments 251-255 may be created and listed in any order. In addition, an arbitrary number of financial instruments may be created and/or listed between the creation and listings of the first and Nth financial instruments.

In one embodiment, the Nth financial instrument 255 may always track the "current" version of the serialized index 210, as indicated by the dotted line in FIG. 2. For example, when the Nth financial instrument 255 was first created and listed, version 1 (213) of the serialized index 210 may have been the "current" version. If the Nth financial instrument 255 would have been settled before any more versions of the serialized index were created, the value of version 1 (213) of the serialized index 210 would have been used to settle the Nth financial instrument 255. However, versions 2 through X have since been created, and version X (215) is now designated as "current" Consequently, the Nth financial instrument now tracks version X (215), Notably, version 1 (213) of the serialized index 210 may still be tracked, e.g., by the first financial instrument 251, even after other version becomes designated "current."

In another embodiment, the second financial instrument 252 may be designated to track version 2 (214), but be listed before the version 2 (214) of the serialized index 210 is created. In this embodiment, the second financial instrument 252 may be traded before the version 2 (214) of the serialized index 214 is created. Consequently, the second financial instrument 252 will begin tracking the version 2 (214) of the serialized index 210 when it is created.

In yet another embodiment, the third financial instrument 253 may also be designated to track version 2 (214). This third financial instrument 253 may be listed after the version 2 (214) of the index 210 is created. Notably, this third financial instrument 253 may continue tracking the version 7 (214) of the serialized index 210 even after other versions of the serialized index are created. For example, the third financial instrument 253 may continue tracking the version 2 (214) of the serialized index 210 after the version X (215) of the serialized index 210 is created.

In FIG. 2, certain financial instruments are shown tracking certain specific versions of a serialized index 210, however, any one of these financial instruments may be designated to track any version of the serialized index 210, whether such instrument is created before or after the particular version of the serialized index being tracked.

With reference to FIG. 3A, an exemplary method 300 of listing and trading financial instruments that track a "future" version of a serialized index is illustrated. One or more computing devices that include a memory for storing instructions and a processor for executing the instructions may be utilized to perform the steps of the illustrated method 300.

At 301, a serialized index is created. At this step, the goals of the serialized index may be defined. In one embodiment, a schedule of new version releases may be defined at this step. In another embodiment, the new versions of the serialized index may be released at predictable intervals, for example every six months, In another embodiment, new versions may be released at any time on as-needed basis or as-desired.

At 305, version 1 of the serialized index is created. At this step, the constituents of the version 1 of the serialized index may be defined along with their associated weighting factors.

At 310, a financial instrument designed to track version 2 of the serialized index is created and listed. At this step, the exact terms of the financial instrument may be defined. Since version 2 of the index does not exist yet, the price of the instrument tracking version 2 at this point may only be determined by market interest in this financial instrument.

At 315, buy/sell orders for the financial instrument designed to track version 2 of the serialized index may be received, e.g., at an exchange server. At 320, a trade for the financial instrument designed to track version 2 of the serialized index may be executed, based on the received orders.

At 325, version 2 of the serialized index is created. At this step, the constituents of the version 2 of the serialized index may be defined along with their associated weighting factors.

At 330, the financial instruments designed to track version 2 of the serialized index is settled. For example, if the financial instrument designed to track version 2 of the serialized index is a futures contract, then cash payments based on the value of the version 2 of the serialized index may be delivered to investors' accounts via, for example, associated investor terminals, based on the terms of the financial instrument.

With reference to FIG. 3B, an exemplary method 350 of listing and trading financial instruments that track a "prior" version of a serialized index is illustrated. One or more computing devices that include a memory for storing instructions and a processor for executing the instructions may be utilized to perform the steps of the illustrated method 350.

At 351, a serialized index is created. At this step, the goals of the serialized index may be defined. In one embodiment, a schedule of new version releases may be defined at this step. In another embodiment, the new versions of the index may be released at predictable intervals, for example, every six months. In another embodiment, new versions may be released at any time on as-needed basis or as-desired.

At 355, version 1 of the serialized index is created. At this step, the constituents of the version 1 of the serialized index may be defined along with the associated weighting factors.

At 360, version 2 of the serialized index is created. At this step, the constituents of the version 2 of the serialized index may be defined along with the associated weighting factors.

At 365, a financial instrument designed to track version 2 of the index is created and listed by a financial exchange server. This financial instrument will continue tracking version 2 or the serialized index even after subsequent versions of the serialized index are created.

At 370, buy/sell orders for the financial instrument designed to track version 2 of the serialized index may be received at the financial exchange server. At 375, a trade for the financial instrument designed to track version 2 of the serialized index may be executed, based on the received orders. At 380 the financial instrument designed to track version 2 of the serialized index may be settled.

It should be understood that exemplary methods illustrated in FIG. 3A and FIG. 3B are provided as examples only. It should be understood that financial instruments designed to track past and future versions of a serialized index maybe be listed and traded in a variety of other methods.

Figure 4:
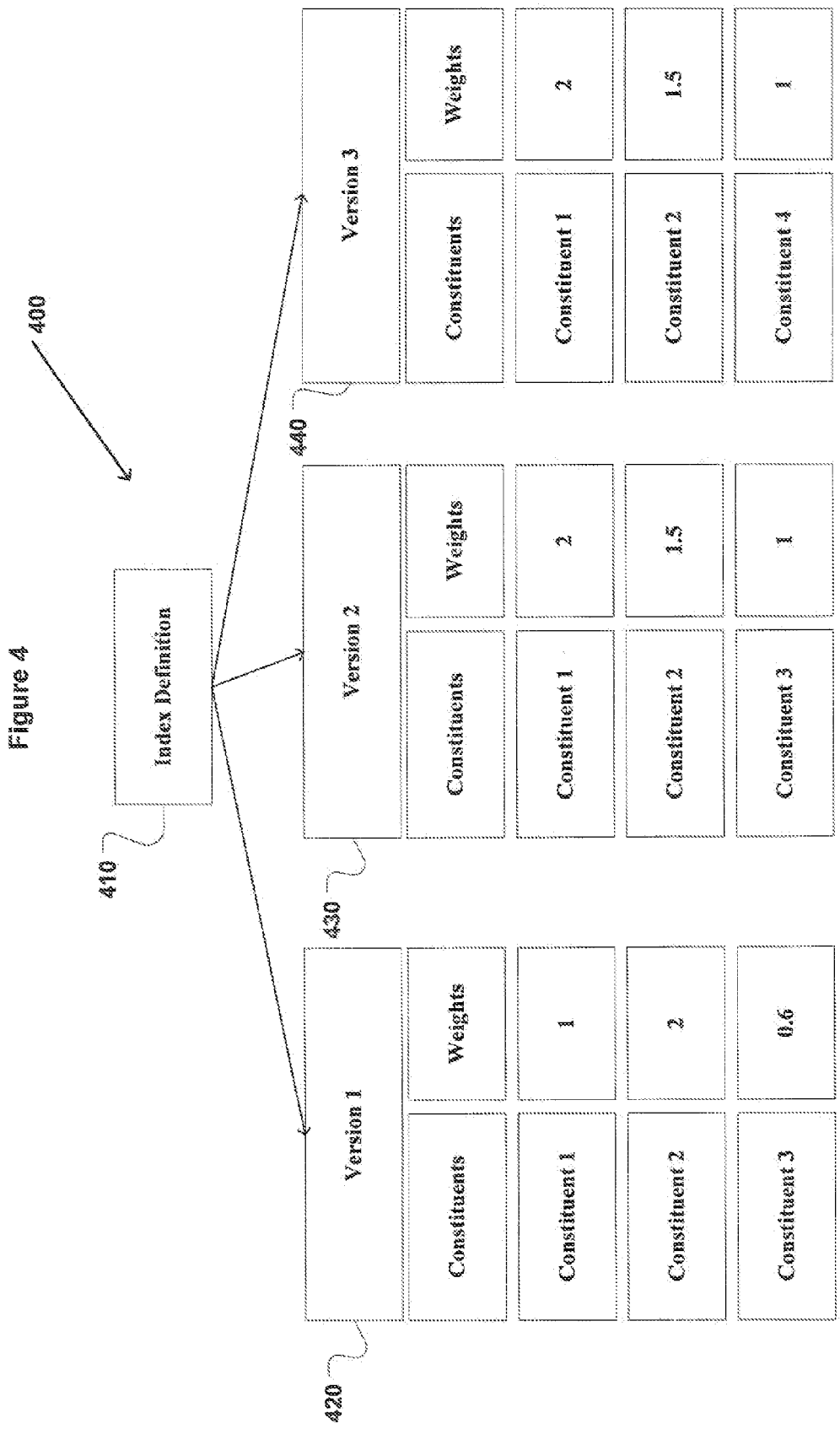
FIG. 4 is a diagram illustrating an exemplary composition of several versions of a serialized index according to various embodiments.

With reference to FIG. 4, an exemplary composition 400 of several versions of a serialized index are shown, according to one embodiment. This exemplary embodiment demonstrates possible constituent composition combinations 420, 430, 440 of several versions of a serialized index 410. These serialized index definitions may be stored by an index maintainer server or by any suitable computing device.

The serialized index 410 may be defined and stored by an index maintainer server. Additionally, the definitions of version 1 of the serialized index 420, version 2 of the serialized index 430 and version 3 of the serialized index 440 may be stored by an index maintainer server. The constituents may be selected from a list that includes, but is not limited to, stocks, bonds, securities, commodities, mutual funds, other indices, swaps, forwards, option and derivatives.

In the exemplary embodiment shown in FIG. 4, version 1 of the serialized index 420 comprises constituent 1, constituent 2 and constituent 3. In this exemplary embodiment, constituent 1 has a weighting factor of "1," constituent 2 has a weighting factor of "2," and constituent 3 has a weighting factor of "0.6."

Version 2 (430) of the serialized index was created by changing the weighting factors of the constituents defining version 1 (420) of the serialized index. In this exemplary embodiment, constituent 1 of version 2 (430) has a weighting factor of "2," constituent 2 has a weighting factor of "1.5," and constituent 3 has a weighting factor of "1."

Version 3 (440) of the serialized index was created by removing one of the constituents defined version 2 (430) of the serialized index and replacing it with a different constituent. In this embodiment, version 3 (440) of the serialized index comprises constituent 1, constituent 2 and constituent 4. Constituent 1 has a weighting factor of "2," constituent 2 has a weighting factor of "1.5," and constituent 4 has a weighting factor of "1."

It should be understood that exemplary version compositions are provided as examples only. It should be understood that new versions of the serialized index may be created by any combination of a list comprising, but not being limited to adjusting weighting factors, adding constituents, removing constituents and other changes.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A method of trading financial instruments, comprising:
   listing via one or more computing devices a financial instrument, said financial instrument specifying which version of a serialized index the financial instrument tracks;
   receiving at an electronic financial exchange an electronic indication to buy or sell the financial instrument;
   the electronic financial exchange executing a trade involving the financial instrument; and
   settling the financial instrument according to the version of the serialized index specified by the financial instrument; and wherein the version specified by the financial instrument is created after the trade is executed.

2. The method of claim 1, wherein the serialized index comprises one or more constituents, each having a constituent weighting, selected from the group consisting of one or more stocks, bonds, securities, commodities, mutual funds, other indices, swaps, forwards, options, and derivatives.

3. The method of claim 2, wherein the serialized index comprises two or more versions, each having a different combination of constituents and constituent weightings.

4. The method of claim 3, wherein the two or more versions comprises at least one current version and one or more prior versions.

5. The method of claim 4, wherein at least one prior version co-exists with the current version and is tracked by at least one other financial instrument, or wherein at least one prior version is discontinued prior to or upon creation of the current version.

6. The method of claim 3, wherein the version specified by the financial instrument is created after the trade is executed.

7. The method of claim 1, wherein the financial instrument is a financial derivative comprising one of a futures contract, a forwards contract, an options contract, and a swap contract.

8. The method of claim 1, further comprising:
   providing via one or more computing devices a serialized index comprised of designated index versions that are established over time,
   wherein the listed financial instrument tracks a particular designated version of the serialized index.

9. An electronic financial exchange system for trading financial instruments, the system comprising:
   one or more processors configured to execute computer executable instructions stored in a non-transitory memory, said computer executable instructions defining:
   a listing module configured to list a financial instrument, said financial instrument specifying which version of a serialized index the financial instrument tracks;
   an orders module configured to receive an electronic indication to buy or sell the financial instrument;
   a trade execution module configured to execute a trade involving the financial instrument; and
   a settlement module configured to settle the financial instrument according to the version of the serialized index specified by the financial instrument,
   wherein the version specified by the financial instrument is created after the trade is executed.

10. The system of claim 9, wherein the serialized index comprises one or more constituents, each having a constituent weighting, selected from the group consisting of one or more stocks, bonds, securities, commodities, mutual funds, other indices, swaps, forwards, options, and derivatives.

11. The system of claim 10, wherein the serialized index comprises two or more versions, each having a different combination of constituents and constituent weightings.

12. The system of claim 11, wherein the two or more versions comprise at least one current version and one or more prior versions.

13. The system of claim 12, wherein the listing module is further configured to list at least one other financial instrument that tracks the prior version.

14. The system of claim 9, wherein the financial instrument is a financial derivative comprising one of a futures contract, a forwards contract, an options contract, and a swap contract.

15. A method of trading financial instruments, comprising:
   generating via one or more computing devices a financial instrument and specifying which version of a serialized index the financial instrument tracks;
   listing via one or more computing devices the financial instrument;
   receiving at an electronic financial exchange an electronic indication to buy or sell the financial instrument;
   the electronic financial exchange executing a trade involving the financial instrument; and
   settling the financial instrument according to the version of the serialized index specified by the financial instrument.

16. An electronic financial exchange system for trading financial instruments, the system comprising:
   one or more processors configured to execute computer executable instructions stored in a non-transitory memory, said computer executable instructions defining:
   a financial instrument that specifies which version of a serialized index the financial instrument tracks;
   a listing module configured to list the financial instrument;
   an orders module configured to receive an electronic indication to buy or sell the financial instrument;
   a trade execution module configured to execute a trade involving the financial instrument; and
   a settlement module configured to settle the financial instrument according to the version of the serialized index specified by the financial instrument.

* * * * *